(12) United States Patent
Watanabe et al.

(10) Patent No.: US 9,780,519 B2
(45) Date of Patent: Oct. 3, 2017

(54) FLAT WAVEGUIDE-TYPE LASER DEVICE

(71) Applicant: Mitsubishi Electric Corporation, Tokyo (JP)

(72) Inventors: Yojiro Watanabe, Tokyo (JP); Takeshi Sakimura, Tokyo (JP); Takayuki Yanagisawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/036,539

(22) PCT Filed: Dec. 27, 2013

(86) PCT No.: PCT/JP2013/085134
§ 371 (c)(1),
(2) Date: May 13, 2016

(87) PCT Pub. No.: WO2015/097869
PCT Pub. Date: Jul. 2, 2015

(65) Prior Publication Data
US 2016/0301179 A1      Oct. 13, 2016

(51) Int. Cl.
*H01S 3/063*       (2006.01)
*H01S 3/16*        (2006.01)
(Continued)

(52) U.S. Cl.
CPC .......... *H01S 3/0632* (2013.01); *H01S 3/1608* (2013.01); *H01S 3/1618* (2013.01);
(Continued)

(58) Field of Classification Search
CPC ...... H01S 3/0632; H01S 3/1618; H01S 3/175; H01S 3/1608; H01S 3/0619
See application file for complete search history.

(56) References Cited

U.S. PATENT DOCUMENTS

| 7,489,436 B1 | 2/2009 | Fiorentino et al. |
| 2003/0161375 A1 | 8/2003 | Filgas et al. |

(Continued)

FOREIGN PATENT DOCUMENTS

| JP | S53-112652 A | 10/1978 |
| JP | S59-188605 A | 10/1984 |

(Continued)

OTHER PUBLICATIONS

International Search Report of PCT/JP2013/085134 dated Feb. 25, 2014.
(Continued)

*Primary Examiner* — Dung Nguyen
(74) *Attorney, Agent, or Firm* — Studebaker & Brackett PC

(57) ABSTRACT

A configuration is provided with a laser medium 1 of a refractive index nc that is an isotropic medium and includes an upper surface and a lower surface, where at least one of the upper surface and the lower surface is bonded with a cladding 2 having a refractive index satisfying a relationship of no<nc<ne or ne<nc<no. This allows selective output of only polarized light generated by a refractive index in the cladding 2 smaller than the refractive index nc at a desired wavelength (e.g. 1535 nm) which can be implemented by using the isotropic medium.

10 Claims, 7 Drawing Sheets

(51) Int. Cl.
*H01S 3/17* (2006.01)
*H01S 3/06* (2006.01)

(52) U.S. Cl.
CPC ............ *H01S 3/175* (2013.01); *H01S 3/0619* (2013.01); *H01S 2301/02* (2013.01)

(56) References Cited

U.S. PATENT DOCUMENTS

| | | | |
|---|---|---|---|
| 2007/0297737 A1 | 12/2007 | Hashimoto | |
| 2008/0247425 A1 | 10/2008 | Welford | |
| 2010/0189151 A1 | 7/2010 | Yanagisawa et al. | |
| 2012/0170604 A1* | 7/2012 | Yanagisawa | H01S 3/0632 372/41 |
| 2014/0376866 A1* | 12/2014 | Sakabe | G02B 6/4432 385/102 |

FOREIGN PATENT DOCUMENTS

| | | |
|---|---|---|
| JP | H01-248584 A | 10/1989 |
| JP | 2003-057689 A | 2/2003 |
| JP | 2003-270611 A | 9/2003 |
| JP | 2004-109355 A | 4/2004 |
| JP | 2007-333756 A | 12/2007 |
| JP | 2008-258627 A | 10/2008 |
| JP | 2009-194176 A | 8/2009 |
| JP | 2009-277943 A | 11/2009 |
| JP | 2010-539524 A | 12/2010 |
| JP | 4754020 B2 | 8/2011 |
| WO | 2009/016703 A1 | 2/2009 |
| WO | 2009/035585 A2 | 3/2009 |

OTHER PUBLICATIONS

An Office Action; "Notification of Reasons for Refusal" issued by the Japanese Patent Office on Nov. 8, 2016, which corresponds to Japanese Patent Application No. 2015-554449 and is related to U.S. Appl. No. 15/036,539; with English machine translation.

JP Office Action dated Jun. 20, 2017, from corresponding JP Appl No. 2015-554449, with English translation, 7 pp.

Takeshi Sakimura et al.; 1.5—μm high-gain and high-power laser amplifier using a Er,Yb:glass planar waveguide for coherent Doppler LIDAR; May 6-11, 2012; CLEO Technical Digest— OSA 2012; San Jose, California, United States.

C.T.A. Brown et al.; A Polarized Brightness-Enhanced Nd:Y3AI5O12 Planar Waveguide Laser; IEEE Photonics Technology Letters, vol. 10, No. 10, pp. 1392-1394, Oct. 1998.

\* cited by examiner

FLAT WAVEGUIDE-TYPE LASER DEVICE

FIELD OF THE INVENTION

The present invention relates to a flat waveguide-type laser device having a flat waveguide-type structure suitable as a light source such as a LIDAR.

BACKGROUND OF THE INVENTION

A flat waveguide-type laser device has the structure in which a laser medium of a thin flat plate shape extending in a traveling direction of a laser beam is interposed between two claddings having refractive indexes lower than that of the laser medium. The laser medium functions as a waveguide.

In this flat waveguide-type laser device, the waveguide is thin and has a high excitation density. Therefore, even when a laser medium with a small cross-section for stimulated emission is used, a large gain can be obtained. This allows implementation of highly efficient amplification and/or emission operations.

Moreover, extending the waveguide in its width direction allows for scaling of output while the excitation density is maintained at a predetermined value.

On the other hand, the flat waveguide-type laser device provides a high gain and is prone to amplification and/or emission in a plurality of waveguide modes, thereby possibly causing difficulty in producing the amplification and/or emission of a laser beam of a required linear polarization. Further, it is difficult to produce the amplification and/or emission of a laser beam in a limited required mode.

In addition, it is difficult to suppress amplification of undesired light (parasitic amplification) and/or parasitic emission that occurs due to confinement of light within the waveguide by total reflections on the outer and end surfaces of the cladding, thereby causing difficulty in efficient emission of the laser beam.

To address the above, a flat waveguide-type laser device that allows for emitting a laser beam in a desired mode is proposed (e.g. refer to Patent Reference 1).

This flat waveguide-type laser device uses, as a core, a birefringent laser medium having an optical axis on a cross-section perpendicular to a light axis that is parallel to a traveling direction of the laser beam. The flat waveguide-type laser device further uses, as a material of claddings bonded to upper and lower surfaces of the laser medium, a material having a refractive index between a refractive index of the laser medium for TE polarized light and a refractive index for TM polarized light.

This prevents one of the TE and TM polarized lights from satisfying conditions for total reflections, thereby enabling laser emission of only one of these polarized lights satisfying the conditions for total reflections to emit a laser beam in a desired mode.

RELATED ART DOCUMENT

Patent Reference

Patent Reference 1: the Pamphlet containing International Publication No. WO 2009-016703 (paragraph [0008], for example)

SUMMARY OF THE INVENTION

Problems to be Solved by the Invention

A flat waveguide-type laser device of the related art is configured as described above. Thus, it is required to use the birefringent laser medium as a laser medium that is employed as a core. Therefore, there has been the problem that a laser beam of a desired wavelength, which can be implemented by employing an isotropic laser medium, cannot be emitted in a desired mode.

The invention is made to solve problems such as those described above, and an object of the invention is to provide a flat waveguide-type laser device that allows for emitting a laser beam of a desired wavelength in a desired mode by using an isotropic medium as a core.

Means for Solving the Problem

A flat waveguide-type laser device according to the invention includes an isotropic medium of a flat plate shape for transmitting a laser beam incident from a side surface thereof; and a cladding bonded to at least one of an upper surface and a lower surface of the isotropic medium. The cladding includes a birefringent crystal having two different refractive indexes in two polarization directions perpendicular to a light axis that is parallel to a traveling direction of the laser beam in the isotropic medium. The isotropic medium includes a material having a refractive index between the two different refractive indexes in the two polarization directions in the cladding.

Advantages of the Invention

According to the invention, the cladding includes the birefringent crystal having two different refractive indexes in two polarization directions perpendicular to a light axis that is parallel to a traveling direction of the laser beam in the isotropic medium. The isotropic medium further includes the material having a refractive index between the two different refractive indexes in the two polarization directions in the cladding. This achieves the advantage that selective output of laser light having a desired wavelength which can be implemented by using the isotropic medium is obtained in a desired mode.

EMBODIMENTS OF THE INVENTION

To describe the invention further in detail, embodiments for carrying out the invention will be described below along the accompanying drawings.

First Embodiment

Figure 1:
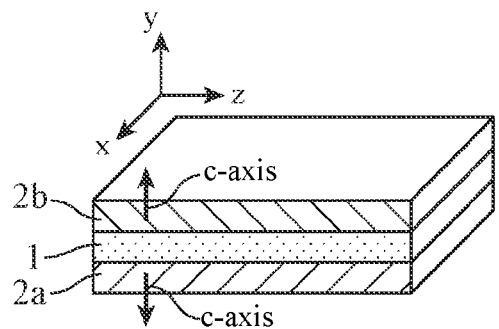
FIG. 1 is a perspective view illustrating a flat waveguide-type laser device according to a first embodiment of the invention.
Figure 2:
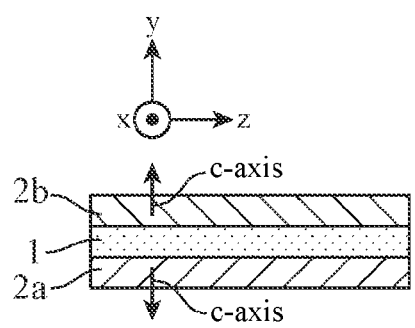
FIG. 2 is a cross-sectional view illustrating the flat waveguide-type laser device according to the first embodiment of the invention.

FIG. 1 is a perspective view illustrating a flat waveguide-type laser device according to a first embodiment of the invention. FIG. 2 is a cross-sectional view illustrating the flat waveguide-type laser device according to the first embodiment of the invention.

In FIGS. 1 and 2, a laser medium 1 includes an isotropic medium of a flat plate shape. The laser medium 1 is an element that absorbs excitation light incident from a side surface thereof to thereby form a population inversion state to generate a gain, and amplifies a laser beam incident from the side surface with the gain when the population inversion state is formed.

In FIGS. 1 and 2, the directions parallel to two sides perpendicular to each other on a plane parallel to upper and lower surfaces (a pair of rectangular surfaces) of the laser medium 1 are defined as an x-axis and a z-axis, respectively. A direction perpendicular to both the x-axis and the z-axis is defined as a y-axis.

Here, the z-axis is assumed as the light axis that is parallel to a propagation direction (traveling direction) of the laser beam.

A cladding 2a is bonded to the lower surface of the laser medium 1 such that an optical axis (c-axis) thereof is perpendicular to the bonded surface between the cladding 2a and the laser medium 1. The cladding 2a includes a birefringent material having different refractive indexes in two polarization directions (a refractive index for a polarization toward the x-axis is denoted by nx and a refractive index for polarization toward the y-axis is denoted by ny) that are perpendicular to the light axis of the laser beam.

A cladding 2b is bonded to the upper surface of the laser medium 1 such that an optical axis (c-axis) thereof is perpendicular to the bonded surface between the cladding 2b and the laser medium 1. The cladding 2b includes a birefringent material having different refractive indexes in two polarization directions (a refractive index for polarization toward the x-axis is denoted by nx, and a refractive index for polarization toward the y-axis is denoted by ny) that are perpendicular to the light axis of the laser beam.

In this first embodiment, the laser medium 1 and claddings 2a and 2b include materials such that a refractive index nc of the laser medium 1 and refractive indexes nx and ny of the claddings 2a and 2b satisfy a relationship of $ny<nc<nx$.

Examples of combinations of specific materials for the laser medium 1 and claddings 2a and 2b that satisfy the relationship of $ny<nc<nx$ will be listed below. Note that combinations are not limited thereto.

Laser medium 1<—>Claddings 2a and 2b Er—Yb-codoped phosphate glass<—>calcite ($CaCO_3$), BBO, or quartz Yb:YAG, Nd:YAG, Er:YAG, Tm:YAG, Ho:YAG, Tm,Ho:YAG or Pr:YAG<—>KTP Nd:glass, Er:glass<—>calcite, BBO, LBO or quartz For example, when Er—Yb-codoped phosphate glass is used as the laser medium 1, the laser medium 1 has a refractive index of approximately 1.52 at a wavelength of 1535 nm.

Also, when calcite is used as the claddings 2a and 2b, the claddings 2a and 2b have refractive indexes corresponding to polarization directions, in a range of approximately 1.48 (abnormal light ray refractive index: ne) to approximately 1.63 (normal light ray refractive index: no) at a wavelength of 1535 nm.

Here, when the c-axis of calcite (both a crystal axis and optical axis) is arranged to be parallel to the y-axis, a relationship between the refractive index nc of the laser medium 1 and refractive indexes nx and ny of the claddings 2a and 2b is expressed as below:

ny=ne (approx. 1.48)<nc (approx. 1.52)<nx=no (approx. 1.63).

Therefore, in the structure where the laser medium 1 is interposed between the claddings 2a and 2b in a vertical direction, an optical waveguide is formed for a laser beam with a linear polarization where the refractive index nc in the laser medium 1 is larger than the refractive indexes of the claddings 2a and 2b.

Namely, the laser medium 1 functions as a core, for the laser beam with a linear polarization where the refractive index nc in the laser medium 1 is larger than the refractive indexes of the claddings 2a and 2b, which guides a laser beam generated from stimulated emission by irradiation with the excitation light while functioning as a laser medium.

Here, operations of the flat waveguide-type laser device having the aforementioned structure will be described.

Figure 3:
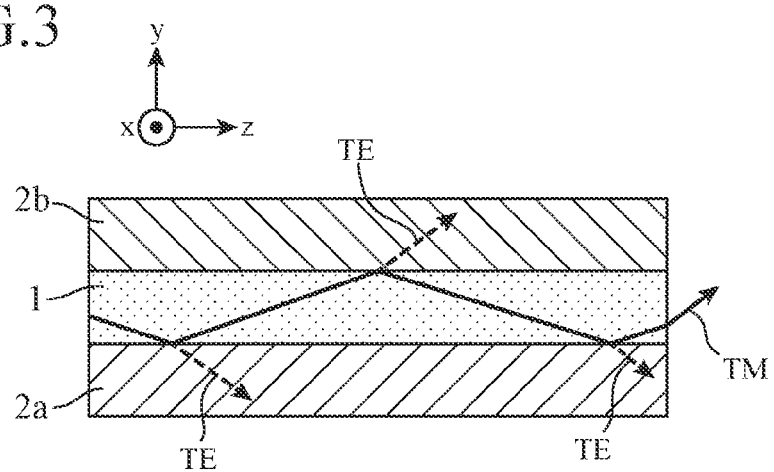
FIG. 3 is an explanatory view schematically illustrating polarization dependency of laser beam propagation in the flat waveguide-type laser device according to the first embodiment of the invention.
Figure 4:
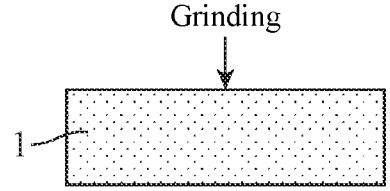
FIG. 4 is a cross-sectional view schematically illustrating an exemplary process of a method of manufacturing the flat waveguide-type laser device (step 1).

FIG. 3 is an explanatory view schematically illustrating polarization dependency of laser beam propagation in the flat waveguide-type laser device according to the first embodiment of the invention.

In the example of the flat waveguide-type laser device in FIG. 3, the claddings 2a and 2b are bonded to the upper surface and lower surface of the laser medium 1, which includes Er—Yb-codoped phosphate glass formed in a flat plate shape. The claddings 2a and 2b include calcite where the c-axis (optical axis) and y-axis are parallel to each other.

Here, the refractive index nc of the laser medium 1 and the refractive indexes nx and ny of the claddings 2a and 2b at the wavelength of 1535 nm are as follows:

nc=approx. 1.52, nx=no (approx. 1.63), and ny=ne (approx. 1.48).

When excitation light is incident from at least one side surface of four side surfaces of the laser medium 1, the laser medium 1 absorbs the excitation light to form a population inversion state thereby to generate a gain.

When a laser beam (seed light) is incident from at least one side surface while the laser medium 1 forms the population inversion state, the laser beam is amplified with the gain.

In the example of FIG. 3, the laser beam is incident from a left end side of the laser medium 1 along the z-axis.

When the refractive index nc of the laser medium 1, which is a core refractive index, is larger than the refractive indexes of the claddings 2a and 2b, the light propagating in the waveguide includes a component satisfying total reflection conditions on boundary surfaces between the core (laser medium 1) and the claddings 2a and 2b. The component is confined within the laser medium 1 and is transmitted in a waveguide mode.

On the other hand, when the refractive index nc of the laser medium 1, which is a core refractive index, is smaller than the refractive indexes of the claddings 2a and 2b, light leaks out from the boundary surfaces between the core (laser medium 1) and the claddings 2a and 2b in a radiation mode, thereby resulting in a large loss.

In the example of FIG. 3, the laser beam propagating in the z-axis in the laser medium 1 includes a laser beam that has polarization toward the y-axis (laser beam of TM mode) and is affected by the refractive index ny of approximately 1.48 in the claddings 2a and 2b. The refractive index ny is smaller than the refractive index nc (approx. 1.52) of the laser medium 1 which is the core refractive index. Therefore, the laser beam of TM mode propagates in the waveguide mode.

On the other hand, the laser beam propagating in the z-axis in the laser medium 1 includes a laser beam that has a polarization toward the x-axis (laser beam of TE mode) and is affected by the refractive index nx of approximately 1.63 in the claddings 2a and 2b. The refractive index nx is larger than the refractive index nc (approx. 1.52) of the laser medium 1 which is the core refractive index. Therefore, no total reflection occurs on the boundary surfaces between the core (laser medium 1) and the claddings 2a and 2b, thus resulting in the radiation mode.

As a result, a large loss is generated while the laser beam in TE mode propagates in the flat waveguide-type laser device. Therefore, in the example of FIG. 3, only the laser beam in TM mode is selectively amplified.

In this manner, when the laser beam is incident parallel to the z-axis, the flat waveguide-type laser device operates as a laser amplifier that amplifies and emits only a component polarized toward the y-axis.

Therefore, in the flat waveguide-type laser device of the first embodiment, an output of linear polarization can be obtained with high efficiency without adding of an optical element such as a polarizer that limits polarized light.

Moreover, it is only required to use a laser beam (seed light) having a component of y-polarized light, thereby enabling alleviation of limitations on polarization states of the seed light not incident on the flat waveguide-type laser device. For example, even when a ratio of y-polarized light to x-polarized light among the seed light not incident on the flat waveguide-type laser device is nine to one, the y-polarized light can be selectively amplified.

Furthermore, when a total reflection mirror is disposed on one of surfaces perpendicular to the z-axis in the laser medium 1 while a partial reflection mirror is disposed on the other surface, emission of a laser beam occurs between the total reflection mirror and the partial reflection mirror. Part of the laser beam is output from the partial reflection mirror.

Here, the laser beam in TE mode is subjected to a large loss and thus emission thereof is suppressed. Therefore, only the laser beam in TM mode is subjected to emission, thereby resulting in an output of a linear polarization.

Therefore, in the flat waveguide-type laser device of the first embodiment, an output of the linear polarization can be obtained with high efficiency without adding of an optical element such as a polarizer that limits polarized light.

It is noted that the total reflection mirror and the partial reflection mirror may be implemented by forming a dielectric film or metal film directly on the surface perpendicular to the z-axis in the laser medium 1.

The configuration as described above allows for suppressing amplification or emission in the x-axis direction, thereby enabling highly efficient amplification or emission of a laser beam with a linear polarization toward the y-axis.

Next, a method of manufacturing the flat waveguide-type laser device of the first embodiment will be described.

FIGS. 4 to 8 are cross-sectional views schematically illustrating exemplary processes of the method of manufacturing the flat waveguide-type laser device.

First, the laser medium 1 is cut into a flat plate shape. Then one of z-x surfaces is ground or polished (refer to FIG. 4).

Figure 5:
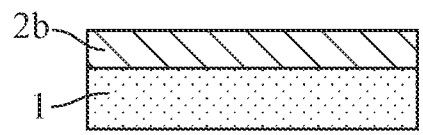
FIG. 5 is a cross-sectional view schematically illustrating an exemplary process of the method of manufacturing the flat waveguide-type laser device (step 2).

Next, the cladding 2b including the material having the refractive indexes nx and ny which satisfies ny<nc<nx is bonded to the ground or polished surface of the laser medium 1 (refer to FIG. 5).

This cladding 2b may be directly bonded to the laser medium 1 by a method such as optical contact, surface activated bonding, and/or diffusion bonding, or may be bonded to the laser medium 1 with an optical adhesive having a refractive index smaller than that of the laser medium 1.

Alternatively, a thin film of the cladding 2b may be formed on the ground or polished surface of the laser medium 1 by a sputtering method, vapor deposition method, or chemical vapor deposition (CVD) method. Also, the cladding 2b may be bonded while a buffer layer for mitigating a difference in thermal expansion of the laser medium 1 and cladding 2b is interposed.

Figure 6:
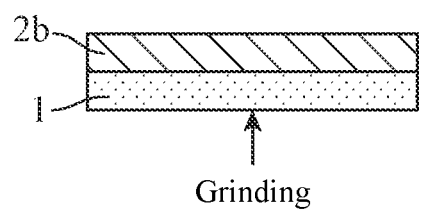
FIG. 6 is a cross-sectional view schematically illustrating an exemplary process of the method of manufacturing the flat waveguide-type laser device (step 3).
Figure 7:
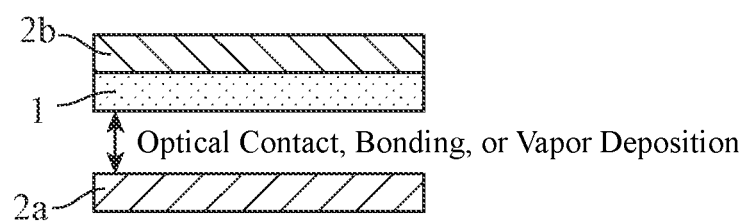
FIG. 7 is a cross-sectional view schematically illustrating an exemplary process of the method of manufacturing the flat waveguide-type laser device (step 4).

Next, the other z-x surface of the laser medium 1 is ground or polished to have a predetermined thickness (refer to FIG. 6). The cladding 2a including the material of the refractive indexes nx and ny which satisfies ny<nc<nx is then bonded to the ground or polished surface of the laser medium 1 (refer to FIG. 7). This cladding 2a may also be bonded by the same method as the cladding 2b.

Figure 8:
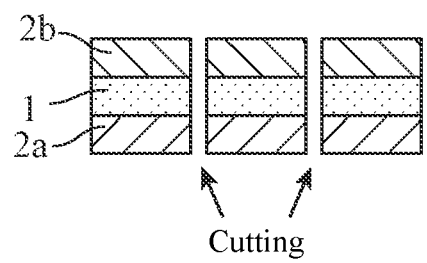
FIG. 8 is a cross-sectional view schematically illustrating an exemplary process of the method of manufacturing the flat waveguide-type laser device (step 5).

Lastly, cutting the stacked body of the laser medium 1 and claddings 2a and 2b in a direction is performed as illustrated in FIG. 8, resulting in manufacturing the flat waveguide-type laser device of a desired size.

In the first embodiment, the flat waveguide-type laser device with the configuration in which the laser medium 1 is interposed between the claddings 2a and 2b in the vertical direction has been described. Alternatively, only one cladding 2 of the claddings 2a and 2b, having refractive indexes satisfying the relationship of ny<nc<nx, may be bonded to the upper surface or lower surface of the laser medium 1.

In this case, the surface of the laser medium 1 where the cladding 2 is not bonded can be in contact with nothing but the air (the air can be a cladding), or can be bonded to a material, as a cladding, having any refractive index smaller than the refractive index nc of the laser medium 1.

Moreover, in the first embodiment, the claddings 2a and 2b are bonded to the laser medium 1 so as to align the optical axis (c-axis) of the claddings 2a and 2b with the y-axis, thereby allowing for selecting only the laser beam in TM mode. Alternatively, only the laser beam in TE mode can be selected by bonding the claddings 2a and 2b to the laser medium 1 so as to align, with the x-axis, the optical axis of the claddings 2a and 2b having refractive indexes satisfying the relationship of nx<nc<ny.

Besides the above, when the laser medium 1 includes a material having the normal light ray refractive index of no smaller than the abnormal light ray refractive index of ne, the claddings 2a and 2b, having refractive indexes satisfying a relationship of nx (=no)<nc<ny (=ne), may be bonded to the laser medium 1 so as to align the optical axis (c-axis) of the claddings 2a and 2b with the y-axis. Alternatively, the claddings 2a and 2b, having refractive indexes satisfying a relationship of ny (=no)<nc<nx (=ne), may be bonded to the laser medium 1 so as to align the optical axis (c-axis) of the claddings 2a and 2b with the x-axis.

In these configurations, in contrast to the above descriptions, a laser beam having a polarization in a direction perpendicular to the optical axis (c-axis) of the claddings 2a and 2b is transmitted in a waveguide mode in the flat waveguide-type laser device, while a laser beam having a polarization along the optical axis is in a radiation mode thus generating a large loss during propagation in the flat waveguide-type laser device. As a result, only a laser beam in a specific polarization direction is selectively amplified, thereby providing an output of a laser beam with a linear polarization toward the x-axis or y-axis direction.

Moreover, the optical axis (c-axis) of the claddings 2a and 2b may be arranged to satisfy a relationship of ne<nc<no or no<nc<ne with respect to the refractive index nc of the laser medium 1, thereby allowing for obtaining a laser beam with a linear polarization in an arbitrary direction in a range satisfying the above relationship.

As apparent from the above, according to the first embodiment, the cladding 2 having refractive indexes satisfying a relationship of no<nc<ne or ne<nc<no is configured to be bonded to at least one of the upper surface and lower surface of the laser medium 1 that is an isotropic medium having the refractive index nc. Therefore, at a desired wavelength (e.g. 1535 nm) which can be implemented by employing the isotropic medium, an effect can be achieved where only polarized light of which refractive index in the cladding 2 is smaller than the refractive index nc is selectively output.

In the first embodiment, the claddings 2a and 2b are configured to include a birefringent material having two different refractive indexes in two polarization directions. Alternatively, similar effect can be obtained with a configuration where claddings 2a and 2b include an anisotropic medium such as a biaxial crystal and a refractive index of the core (laser medium 1) is set to be between refractive indexes which affect a propagating laser beam in the claddings 2a and 2b of the laser medium 1.

Note that, when an inactive isotropic medium is used instead of the laser medium 1, such flat waveguide-type laser device functions as a polarizer.

Second Embodiment

Figure 9:
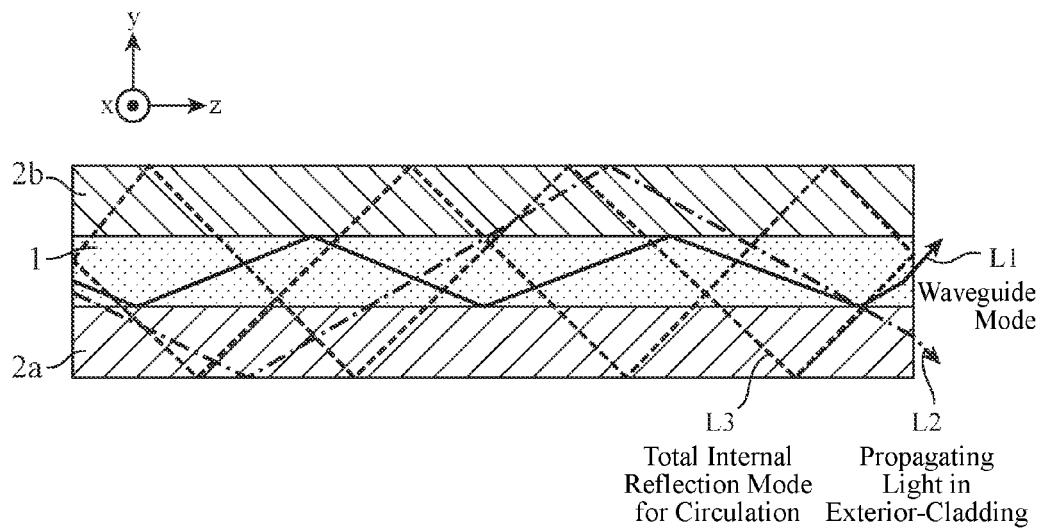
FIG. 9 is an explanatory view schematically illustrating an exemplary optical path of a laser beam in the flat waveguide-type laser device.

FIG. 9 is an explanatory view schematically illustrating an exemplary optical path of a laser beam in a flat waveguide-type laser device.

When refractive indexes outside the claddings 2a and 2b are smaller than those of claddings 2a and 2b, in addition to a laser beam amplified or emitted as a waveguide mode L1, a laser beam leaked out from the laser medium 1 into the claddings 2a and 2b in a radiation mode may be reflected on boundaries between the claddings 2a, 2b and the outside thereof and enter into the laser medium 1 again.

As a result, the laser beam reentering the laser medium 1 is amplified (hereinafter amplification of a laser beam other than a target laser beam is referred to as parasitic amplification), which may result in a phenomenon where a gain accumulated in the laser medium 1 is consumed.

Such cases include a propagating light L2 in the exterior-cladding, which is a laser beam reflected on the boundary between the claddings 2a and 2b and the outside thereof, output from an output end surface as it is and a total internal reflection mode L3 for circulation where a laser beam, leaked into the claddings 2a and 2b as the radiation mode and totally reflected on the boundary between the claddings 2a and 2b and the outside thereof, is completely confined within the laser medium 1 and the claddings 2a and 2b when the laser beam satisfies total reflection conditions even on the output end surface of the laser medium 1.

In particular, the laser beams (the propagating light L2 in the exterior-cladding and the total internal reflection mode L3 for circulation) reflected under total reflection conditions have a small loss and thus cause laser emission in the laser medium 1 and the claddings 2a and 2b (hereinafter referred to as parasitic emission) while consuming the gain in the laser medium 1. As a result, this reduces efficiency of the flat waveguide-type laser device as an amplifier and a laser emitter.

In a second embodiment, therefore, a flat waveguide-type laser device where reflection of a laser beam, leaked into the claddings 2a and 2b as the radiation mode, on the boundary between the claddings 2a and 2b and the outside thereof is suppressed, thereby allowing for highly efficiently amplifying and emitting only a desired laser beam.

Figure 10:
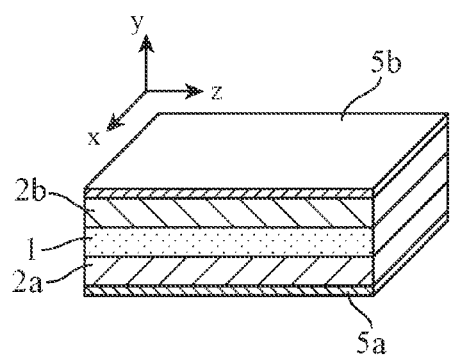
FIG. 10 is a perspective view illustrating a flat waveguide-type laser device according to a second embodiment of the invention.
Figure 11:
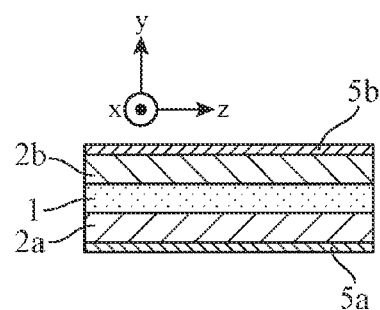
FIG. 11 is a cross-sectional view illustrating the flat waveguide-type laser device according to the second embodiment of the invention.

FIG. 10 is a perspective view illustrating a flat waveguide-type laser device according to the second embodiment of the invention. FIG. 11 is a cross-sectional view illustrating the flat waveguide-type laser device according to the second embodiment of the invention.

In FIGS. 10 and 11, directions of x-axis, y-axis, and z-axis are the same as in FIGS. 1 and 2 of the first embodiment.

An absorbing layer 5a is bonded to a lower surface (surface not bonded to a laser medium 1) of a cladding 2a and includes a material that absorbs a laser beam.

An absorbing layer 5b is bonded to an upper surface (surface not bonded to the laser medium 1) of a cladding 2b and includes a material that absorbs a laser beam.

Note that the absorbing layers 5a and 5b are only required to include a material that absorbs a laser beam. For example, chromium (Cr) or a chromium-doped material may be used.

Next, operations of the flat waveguide-type laser device will be described.

Figure 12:
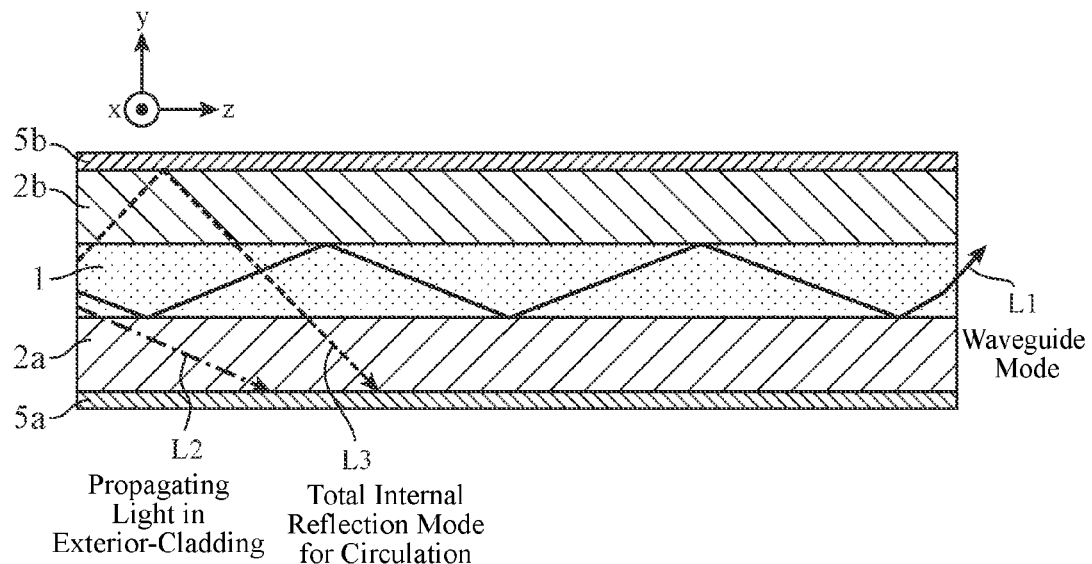
FIG. 12 is an explanatory view schematically illustrating polarization dependency of laser beam propagation in the flat waveguide-type laser device according to the second embodiment of the invention.

FIG. 12 is an explanatory view schematically illustrating polarization dependency of laser beam propagation in the flat waveguide-type laser device according to the second embodiment of the invention.

In the example of the flat waveguide-type laser device in FIG. 12, the claddings 2a and 2b are bonded to an upper surface and lower surface of the laser medium 1, which includes Er—Yb-codoped phosphate glass formed in a flat plate shape. The claddings 2a and 2b include calcite where the c-axis (optical axis) and y-axis are parallel to each other.

Here, a refractive index nc of the laser medium 1 equals approximately 1.52 and the refractive index nx of the claddings 2a and 2b equals approximately 1.63 (normal light ray refractive index no) while the refractive index ny of the claddings 2a and 2b equals approximately 1.48 (abnormal light ray refractive index ne).

The flat waveguide-type laser device not provided with the absorbing layers 5a and 5b has, as described in FIG. 9, the waveguide mode L1, where a laser beam is totally reflected on the boundary between the core (laser medium 1) and the claddings 2a and 2b and is transmitted in the core, the propagating light L2 in the exterior-cladding, which is reflected on the boundary between the claddings 2a and 2b and the outside thereof and is output from an output end surface, and the total internal reflection mode L3 for circulation, where a laser beam is reflected on the boundary between the claddings 2a and 2b and the outside thereof and is further completely confined within the laser medium 1 and the claddings 2a and 2b while total reflection conditions are satisfied on the output end surface.

Among these, as described above, the propagating light L2 in the exterior-cladding and the total internal reflection mode L3 for circulation are caused by one of the two polarized lights in the laser medium 1 which corresponds to a refractive index lower than refractive indexes of the claddings 2a and 2b.

When the propagating light L2 in the exterior-cladding and total reflection circulation mode L3 occur, the gain accumulated in the laser medium 1 is consumed and thus a gain for a desired laser beam (laser beam in the waveguide mode L1) is reduced, resulting in reduced efficiency in amplification and emission of the laser beam. Components other than the waveguide mode L1 are reflected on the boundary between the claddings 2a and 2b and the outside thereof.

In the second embodiment, the absorbing layers 5a and 5b are arranged outside the claddings 2a and 2b and thus components of the laser beam reflected outside the claddings 2a and 2b are absorbed by the absorbing layers 5a and 5b.

As a result, the propagating light L2 in the exterior-cladding and the total internal reflection mode L3 for circulation are suppressed, thereby allowing for efficiently amplifying a desired laser beam propagating in the waveguide mode L1.

A method of manufacturing the flat waveguide-type laser device having the absorbing layers 5a and 5b may include, similarly to the first embodiment, bonding the claddings 2a and 2b to the laser medium 1 and then forming the absorbing layer 5a including chromium or titanium on the lower surface of the cladding 2a by a sputtering method or a vapor deposition method. The absorbing layer 5b including chromium or titanium is further formed on the upper surface of the cladding 2b.

Note that absorptivity of a metal film of chromium or titanium is less dependent on the wavelength and thus is capable of absorbing laser beams of a wide wavelength bandwidth. Therefore, when Er—Yb-codoped phosphate glass is used as the laser medium 1 to amplify the laser beam of a wavelength of 1550 nm, parasitic emission at 1535 nm where the Er—Yb-codoped phosphate glass has a gain can be suppressed.

Furthermore, as the absorbing layers 5a and 5b, a material that selectively absorbs a laser beam with a wavelength where the laser medium 1 has the largest gain may be used.

For example, when Er—Yb-codoped phosphate glass is used as the laser medium 1 to amplify the laser beam of a wavelength of 1550 nm, it is important to suppress parasitic amplification and parasitic emission at the wavelength of 1535 nm since the Er—Yb-codoped phosphate glass has a large gain at the wavelength of 1535 nm.

Therefore, using a material having a peak in absorption near the wavelength of 1535 nm as the absorbing layers 5a and 5b allows for suppressing parasitic amplification and parasitic emission at the wavelength of 1535 nm.

In the second embodiment, by arranging the absorbing layers 5a and 5b outside the claddings 2a and 2b, the propagating light L2 in the exterior-cladding and the total internal reflection mode L3 for circulation that occur in the flat waveguide-type laser device are suppressed. However, instead of arranging the absorbing layers 5a and 5b outside the claddings 2a and 2b, the lower surface of the cladding 2a (the surface not bonded to the laser medium 1) and the upper surface of the cladding 2b (the surface not bonded to the laser medium 1) may be roughened surfaces.

By causing the lower surface of the cladding 2a and the upper surface of the cladding 2b to be roughened surfaces, light reflected on the boundary between the claddings 2a and 2b and the outside thereof is scattered on the roughened surfaces, thereby resulting in a loss of components subjected to parasitic amplification or parasitic emission.

Furthermore, the absorbing layers 5a and 5b may be attached to the roughened surfaces of the claddings 2a and 2b.

Configuring in such a manner, scattering of the laser beam on the roughened surfaces and absorption of the laser beam by the absorbing layers 5a and 5b together suppress parasitic amplification or parasitic emission, thereby allowing for efficiently amplifying a desired laser beam.

In the second embodiment, the flat waveguide-type laser device with the configuration where the laser medium 1 is interposed between the claddings 2a and 2b in the vertical direction has been described. However, the cladding 2 and absorbing layer 5 may be bonded to only the upper surface or lower surface of the laser medium 1.

In this case, on the surface of the laser medium 1 where the cladding 2 and absorbing layer 5 are not bonded to may be provided with nothing but be in contact with the air (air may be a cladding) or be bonded with a material, as a cladding, having any refractive index smaller than the refractive index nc of the laser medium 1.

As apparent from the above, the second embodiment is configured such that the absorbing layer 5a that absorbs a laser beam is provided to the lower surface of the cladding 2a and the absorbing layer 5b that absorbs a laser beam is provided to the upper surface of the cladding 2b. Thus, the two polarized lights occurring in the laser medium 1 contain the polarized light that corresponds to a smaller refractive index of the laser medium 1 than the refractive indexes of the claddings 2a and 2b and that induces the propagating light L2 in the exterior-cladding and the total internal reflection mode L3 for circulation. The propagating light L2 and the total internal reflection mode L3 are absorbed or diffused. This enables suppression of parasitic amplification and parasitic emission, thereby achieving an effect of effectively amplifying a desired laser beam propagating in the waveguide mode L1.

Third Embodiment

Figure 13:
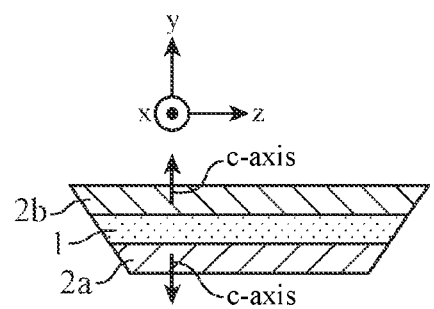
FIG. 13 is a cross-sectional view illustrating a flat waveguide-type laser device according to a third embodiment of the invention.

FIG. 13 is a cross-sectional view illustrating a flat waveguide-type laser device according to a third embodiment of the invention. In FIG. 13, the same signs as those in FIG. 2 denote the same or corresponding parts as those in FIG. 2 and thus descriptions thereon are omitted.

In the first and second embodiments, the laser medium 1 and claddings 2a and 2b are formed in a rectangular parallelepiped. Alternatively, since the side surfaces of the laser medium 1 and claddings 2a and 2b include a side surface receiving the incident laser beam and a side surface emitting the laser beam, at least one of these side surfaces may be tilted.

That is, in the flat waveguide-type laser devices of the first and second embodiments, side surfaces of the laser medium 1 and claddings 2a and 2b are parallel to an x-y surface. However, in the flat waveguide-type laser device of the third embodiment, a side surface of the laser medium 1 and claddings 2a and 2b is tilted relative to the x-y surface.

In the example of FIG. 13, both of the side surface where the laser beam is incident on and the side surface where the laser beam is output from are tilted relative to the x-y surface.

In this manner, by causing the side surfaces of the laser medium 1 and claddings 2a and 2b to be tilted relative to the x-y surface, laser emission (parasitic emission) that occurs between a pair of side surfaces perpendicular to the z-axis of the laser medium 1 can be suppressed, thereby allowing for effectively amplifying a desired laser beam.

In the example of FIG. 13, a pair of side surfaces are tilted; however, a similar effect can also be achieved by causing only one of the side surfaces to be tilted.

Fourth Embodiment

Figure 14:
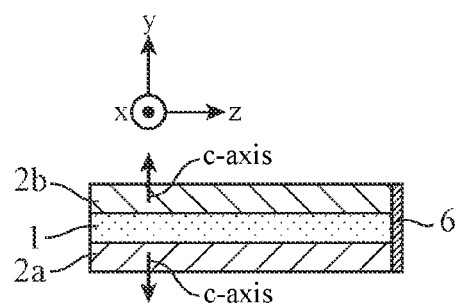
FIG. 14 is a cross-sectional view illustrating a flat waveguide-type laser device according to a fourth embodiment of the invention.

FIG. 14 is a cross-sectional view illustrating a flat waveguide-type laser device according to a fourth embodiment of the invention. In FIG. 14, the same signs as those in FIG. 2 denote the same or corresponding parts as those in FIG. 2 and thus descriptions thereon are omitted.

In the first to third embodiments, the laser beam is output from the side surface of the laser medium. 1 opposite to the side surface where the laser beam is incident on. However, a high-reflectance coating 6 that reflects a laser beam may be applied to the side surfaces of the laser medium 1 and claddings 2a and 2b opposite to the side surface where the laser beam is incident on.

When the high-reflectance coating 6 that reflects a laser beam is applied to the side surfaces of the laser medium 1 and claddings 2a and 2b opposite to the side surface where the laser beam is incident on, when the laser beam amplified by the laser medium 1 and transmitted along the z-axis (in the figure, laser beam transmitted rightward) reaches the side surface where the high-reflectance coating 6 is applied, the laser beam is reflected on the side surface and is output from the side surface where the laser beam has been incident on. That is, the laser beam is subjected to round propagation.

The laser beam is reflected on the side surface applied with the high-reflectance coating 6 and is transmitted leftward in the figure, thereby further amplified by the laser medium 1. Thus, high output of the laser beam can be achieved.

Fifth Embodiment

Figure 15:
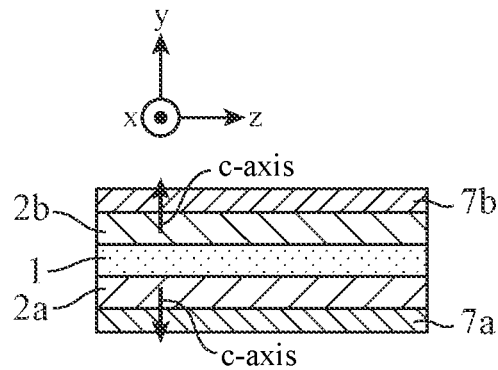
FIG. 15 is a cross-sectional view illustrating a flat waveguide-type laser device according to a fifth embodiment of the invention.

FIG. 15 is a cross-sectional view illustrating a flat waveguide-type laser device according to a fifth embodiment of the invention. In FIG. 15, the same signs as those in FIG. 2 denote the same or corresponding parts as those in FIG. 2 and thus descriptions thereon are omitted.

A cladding 7a is a second cladding bonded to a lower surface (surface not bonded to a laser medium 1) of a cladding 2a.

A cladding 7b is a second cladding bonded to an upper surface (surface not bonded to the laser medium 1) of a cladding 2b.

In the fifth embodiment, the claddings 2a and 2b correspond to first claddings.

In the first, third, and fourth embodiments, the x-z surfaces of the claddings 2a and 2b not bonded to the laser medium 1 form air layers. Excitation light incident from the side surface is thus confined between the claddings 2a and 2b or between the upper and lower air layers.

On the other hand, in the fifth embodiment, the claddings 7a and 7b are bonded to x-z surfaces of the claddings 2a and 2b not bonded to the laser medium 1 and thus the excitation light incident from the side surface is confined between the cladding 2a and cladding 2b or between the cladding 7a and cladding 7b.

Here, a refractive index of the claddings 7a and 7b for the excitation light is only required to be capable of confining the excitation light between the cladding 7a and cladding 7b.

For example, when a refractive index of the laser medium 1 for the excitation light is denoted by nc, a refractive index of the claddings 2a and 2b for the excitation light is denoted by n1 (claddings 2a and 2b includes a birefringent material and thus the refractive index of the claddings 2a and 2b for excitation light varies according to a polarization direction), and a refractive index of the claddings 7a and 7b for the excitation light is denoted by n2, if the refractive index nc of the laser medium 1 and the refractive index n1 of the claddings 2a and 2b satisfy a relationship of nc>n1, the claddings 7a and 7b include a material satisfying a condition of n1>n2.

On the other hand, if the refractive index nc of the laser medium 1 and the refractive index n1 of the claddings 2a and 2b satisfy a relationship of n1>nc, the claddings 7a and 7b include a material satisfying a condition of nc>n2.

For example, when Er—Yb-codoped phosphate glass is used as the laser medium 1 and calcite as the claddings 2a and 2b while a wavelength of the excitation light is 940 nm, using MgF2, SiO2, or another optical glass material as the claddings 7a and 7b satisfies the above condition and thus excitation light can be confined between the cladding 7a and cladding 7b.

Note that the material is not limited to MgF2 or SiO2 as long as the material satisfies the above condition.

In this manner, the configuration capable of confining excitation light between the cladding 7a and cladding 7b can guide the excitation light with a high output to the laser medium 1, thereby achieving high output of the laser beam.

Furthermore, even when a difference between the refractive index nc of the laser medium 1 for the excitation light and the refractive index n2 of the claddings 7a and 7b for the excitation light is small, it is possible to increase a numerical aperture (NA) for excitation light incidence by allowing a difference between the refractive index n1 of the claddings 2a and 2b for the excitation light and the refractive index n2 of the claddings 7a and 7b for the excitation light. Also, reliability can be enhanced since the excitation light does not face an air layer.

Sixth Embodiment

Figure 16:
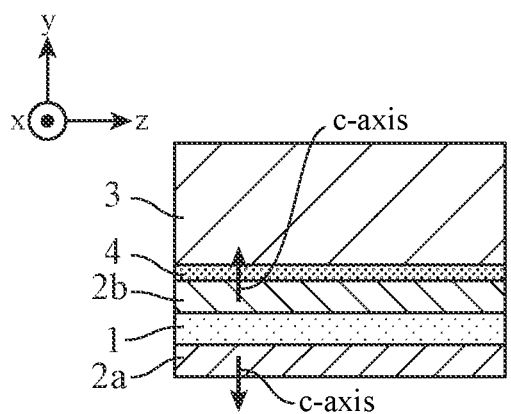
FIG. 16 is a cross-sectional view illustrating a flat waveguide-type laser device according to a sixth embodiment of the invention.

FIG. 16 is a cross-sectional view illustrating a flat waveguide-type laser device according to a sixth embodiment of the invention. In FIG. 16, the same signs as those in FIG. 2 denote the same or corresponding parts as those in FIG. 2 and thus descriptions thereon are omitted.

A substrate 3 is bonded to an upper surface (surface not bonded to a laser medium 1) of a cladding 2b with a bonding agent 4.

In the example of FIG. 16, an example where the substrate 3 is bonded to the upper surface of the cladding 2b is illustrated; however, the substrate 3 may be bonded to a lower surface of the cladding 2a.

By bonding the substrate 3 to an x-z surface of the cladding 2b, the flat waveguide can be reinforced as compared to a case where the x-z surface of the cladding 2b forms an air layer. As a result, reliability can be enhanced.

Here, the bonding agent 4 is used to bond the substrate 3 to the cladding 2b; however, a method of bonding the substrate 3 to the cladding 2b is not limited to a method using the bonding agent 4 but may be, for example, surface activated bonding.

Seventh Embodiment

Figure 17:
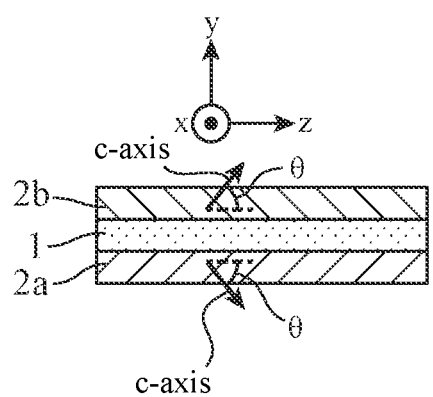
FIG. 17 is a cross-sectional view illustrating a flat waveguide-type laser device according to a seventh embodiment of the invention.

FIG. 17 is a cross-sectional view illustrating a flat waveguide-type laser device according to a seventh embodiment of the invention. In FIG. 17, the same signs as those in FIG. 2 denote the same or corresponding parts as those in FIG. 2 and thus descriptions thereon are omitted.

In the first to sixth embodiments, the claddings 2a and 2b are bonded to the laser medium 1 such that the optical axis (c-axis) of the claddings 2a and 2b is perpendicular to the bonded surfaces between the cladding 2a, 2b and the laser medium 1 (c-axis of the claddings 2a and 2b is parallel to the y-axis). Alternatively, the optical axis (c-axis) of the claddings 2a and 2b may be tilted relative to the bonded surfaces between the cladding 2a, 2b and the laser medium 1 (c-axis of the claddings 2a and 2b may be tilted toward the z-axis).

In the seventh embodiment, as illustrated in FIG. 17, a c-axis of claddings 2a and 2b is tilted toward the z-axis.

An angle formed by the c-axis of the claddings 2a and 2b and the z-axis is defined as an angle θ (defined from symmetry as 0°≤θ≤180°).

Here, among refractive indexes nx and ny of the claddings 2a and 2b for two polarized lights perpendicular to a light axis of a laser beam transmitted in a laser medium 1, the refractive index ny for the polarized light toward the y-axis varies depending on the angle θ in a range of ne<ny<no or no<ny<ne.

For example, when Er—Yb-codoped phosphate glass is used as the laser medium 1 and calcite as the claddings 2a and 2b while a wavelength of the laser beam is 1535 nm, a relationship of ny<nc is satisfied in a range of 59°≤θ≤121°.

When θ=approx. 59° or θ=approx. 121°, a relationship of ny≈nc holds and thus a difference between a refractive index nc of the laser medium 1 and the refractive index ny of the claddings 2a and 2b for TM mode can be reduced. Therefore, it is possible to mitigate occurrence of high-order modes.

Moreover, when ne<no, adjusting the tilt angle θ of the c-axis toward the z-axis allows for adjusting the refractive index of the claddings 2a and 2b for TM mode (where ne<no), thereby enabling control of a spatial mode.

Eighth Embodiment

Figure 18:
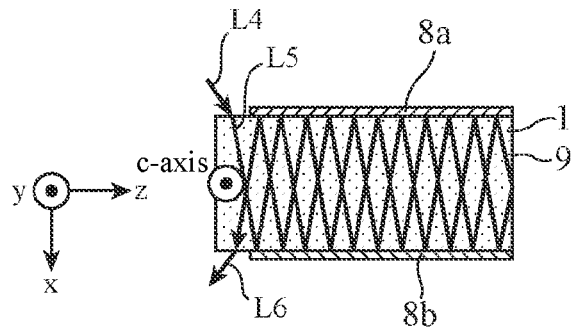
FIG. 18 is a top view illustrating a flat waveguide-type laser device according to an eighth embodiment of the invention.

FIG. 18 is a top view illustrating a flat waveguide-type laser device according to an eighth embodiment of the invention. Note that, in FIG. 18, only a laser medium 1 is illustrated excluding claddings 2a and 2b for convenience of description.

In the eighth embodiment, a high-reflectance coating 8a that reflects a laser beam L5 is applied to a part of a side surface (y-z surface) of a laser medium 1 where seed light L4 is incident on. The high-reflectance coating 8b that reflects the laser beam L5 is also applied to a part of a side surface (y-z surface) of the laser medium 1 opposite to the side surface of the laser medium 1 where the seed light L4 is incident on.

When the seed light L4 is incident on a part not applied with the high-reflectance coating 8a on the side surface (y-z surface) of the laser medium 1, the laser beam L5 in the laser medium 1 is transmitted in the laser medium 1 while repeatedly reflected by the side surfaces applied with the high-reflectance coatings 8a and 8b.

The laser beam L5 is returned by total reflection on an end surface 9 (x-y surface) of the laser medium 1. Alternatively, a high-reflectance coating that reflects the laser beam L5 may be applied to the end surface 9.

Thereafter, when the laser beam L5 reaches a part not applied with the high-reflectance coating 8b on the other side surface (y-z surface) of the laser medium 1, the laser beam L5 is ejected as amplified light L6 from the part not applied with the high-reflectance coating 8b.

For example, when Er—Yb-codoped phosphate glass is used as the laser medium 1 and calcite as the claddings 2a and 2b while a wavelength of the laser beam is 1535 nm, the TE mode performs as a radiation mode while the TM mode performs as a waveguide mode.

As described above, applying the high-reflectance coatings 8a and 8b on parts of the pair of the side surfaces of the laser medium 1 allows for extending a length of an optical path of the laser beam L5. Thus, high output of the laser beam can be achieved.

Ninth Embodiment

Figure 19:
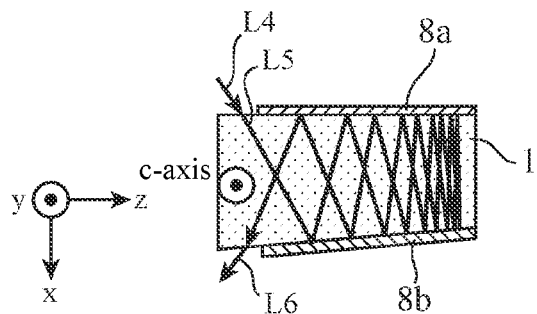
FIG. 19 is a top view illustrating a flat waveguide-type laser device according to a ninth embodiment of the invention.

FIG. 19 is a top view illustrating a flat waveguide-type laser device according to a ninth embodiment of the invention.

Note that, in FIG. 19, only a laser medium 1 is illustrated excluding claddings 2a and 2b for convenience of description.

In the eighth embodiment, the pair of the side surfaces applied with the high-reflectance coatings 8a and 8b are parallel to each other. However, as illustrated in FIG. 19, the side surface applied with the high-reflectance coating 8a and the side surface applied with the high-reflectance coating 8b may not be parallel to each other.

In a configuration where the side surface applied with the high-reflectance coating 8a and the side surface applied with the high-reflectance coating 8b are not parallel to each other, the laser beam L5 in the laser medium 1 has varying incidence angles on the side surfaces applied with the high-reflectance coatings 8a and 8b (in the figure, rightward propagation has gradually decreasing incidence angle while leftward propagation has gradually increasing incidence angle).

Therefore, the laser beam L5 in the laser medium 1 is caused to return without touching a right side surface (x-y surface) of the laser medium 1 in the figure.

This allows for mitigating deterioration of beam quality as compared to the eighth embodiment.

Also, the laser beam can be densified and extraction of energy can be enhanced. Thus, high output of the laser beam can be achieved.

Tenth Embodiment

Figure 20:
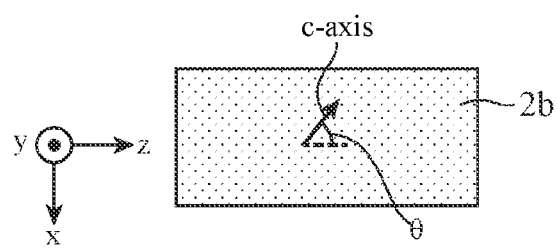
FIG. 20 is a top view illustrating a flat waveguide-type laser device according to a tenth embodiment of the invention.

FIG. 20 is a top view illustrating a flat waveguide-type laser device according to a tenth embodiment of the invention. Note that, in FIG. 20, only a laser medium 1 is illustrated excluding claddings 2a and 2b for convenience of description.

In the first embodiment, the optical axis (c-axis) of the claddings 2a and 2b is perpendicular to the bonded surfaces between the laser medium 1 and the claddings 2a and 2b (c-axis of the claddings 2a and 2b is parallel to the y-axis). However, as illustrated in FIG. 20, the optical axis (c-axis) of the claddings 2a and 2b may be parallel to the bonded surfaces between the laser medium 1 and the claddings 2a and 2b (c-axis of the claddings 2a and 2b is included on the x-z surface).

Furthermore, the optical axis (c-axis) of the claddings 2a and 2b may be tilted relative to the traveling direction of a laser beam. In the example of FIG. 20, the optical axis is tilted by an angle θ.

In the tenth embodiment, as illustrated in FIG. 20, the optical axis (c-axis) of the claddings 2a and 2b is included on the x-z surface. An angle formed by the c-axis of the claddings 2a and 2b and the z-axis is defined as the angle θ (defined from symmetry as 0°≤θ≤180°).

Here, among refractive indexes nx and ny of the claddings 2a and 2b for two polarized lights perpendicular to a light axis of the laser beam transmitted in the laser medium 1, the refractive index nx for the polarized light toward the x-axis varies depending on the angle θ formed in a range of ne<nx<no or no<nx<ne.

For example, when Er—Yb-codoped phosphate glass is used as the laser medium 1 and calcite as the claddings 2a and 2b while a wavelength of the laser beam is 1535 nm, the relationship of nx<nc is satisfied in a range of 59°≤θ≤121°.

When θ=approx. 59° or θ=approx. 121°, a relationship of nx≈nc holds and thus a difference between a refractive index nc of the laser medium 1 and the refractive index nx of the claddings 2a and 2b for TE mode can be reduced. Therefore, it is possible to mitigate occurrence of high-order modes.

Moreover, when the angle formed by the optical axis (c-axis) of the claddings 2a and 2b and the traveling direction of the laser beam is out of the range of the angle θ, a radiation mode occurs. The aforementioned example therefore has an effect of suppressing parasitic emission and parasitic amplification in the x-axis direction as well as parasitic emission and parasitic amplification in other circulation modes.

Moreover, when ne<no, adjusting the tilt angle θ of the c-axis relative to the z-axis allows for adjusting the refractive index of the claddings 2a and 2b for TE mode, thereby enabling control of a spatial mode. Furthermore, parasitic emission and parasitic amplification can be suppressed.

Eleventh Embodiment

Figure 21:
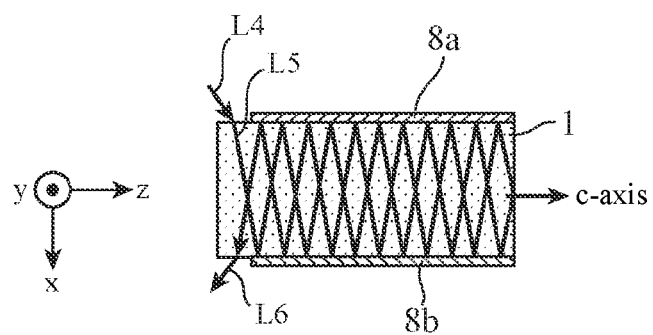
FIG. 21 is a top view illustrating a flat waveguide-type laser device according to an eleventh embodiment of the invention.

FIG. 21 is a top view illustrating a flat waveguide-type laser device according to an eleventh embodiment of the invention. Note that, in FIG. 21, only a laser medium 1 is illustrated excluding claddings 2a and 2b.

In the eighth embodiment, the optical axis (c-axis) of the claddings 2a and 2b are perpendicular to the bonded surfaces between the laser medium 1 and the claddings 2a and 2b (c-axis of the claddings 2a and 2b is parallel to the y-axis). However, as illustrated in FIG. 21, the optical axis (c-axis) of the claddings 2a and 2b may be parallel to the bonded surfaces between the laser medium 1 and the claddings 2a and 2b (c-axis of the claddings 2a and 2b is parallel to the z-axis).

In the eleventh embodiment, the optical axis (c-axis) of the claddings 2a and 2b is parallel to the z-axis. An angle formed by the traveling direction of the laser beam and the c-axis is defined as an angle θ (defined from symmetry as 0°≤θ≤1800).

Here, among refractive indexes nTE and nTM (=ny) of the claddings 2a and 2b for two polarized lights perpendicular to a light axis of the laser beam propagating in the laser medium 1, the refractive index nTE varies depending on the angle θ formed in a range of ne<nTE<no or no<nTE<ne.

For example, when Er—Yb-codoped phosphate glass is used as the laser medium 1 and calcite as the claddings 2a and 2b while a wavelength of the laser beam is 1535 nm, the relationship of nTE<nc is satisfied in a range of 59°≤θ≤121°.

When θ=approx. 59° or θ=approx. 121°, a relationship of nTE≈nc holds and thus a difference between a refractive index nc of the laser medium 1 and the refractive index nTE of the claddings 2a and 2b for TE mode can be reduced. Therefore, it is possible to mitigate occurrence of high-order modes.

In this manner, even when the c-axis of the claddings 2a and 2b is parallel to the z-axis, if ne<no, it is possible to adjust the refractive index of the claddings 2a and 2b for TE mode and to control a spatial mode.

Twelfth Embodiment

Figure 22:
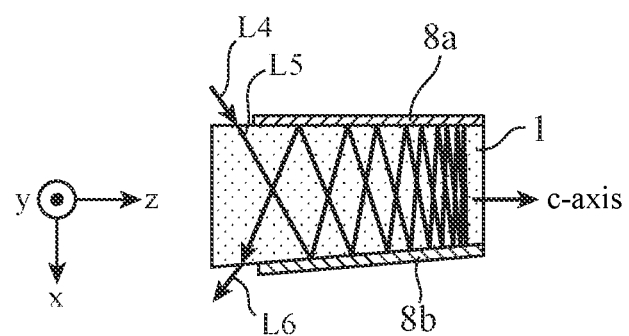
FIG. 22 is a top view illustrating a flat waveguide-type laser device according to a twelfth embodiment of the invention.

FIG. 22 is a top view illustrating a flat waveguide-type laser device according to a twelfth embodiment of the invention. Note that, in FIG. 22, only a laser medium 1 is illustrated excluding claddings 2a and 2b.

In the ninth embodiment, the optical axis (c-axis) of the claddings 2a and 2b is perpendicular to the bonded surfaces between the laser medium 1 and the claddings 2a and 2b (c-axis of the claddings 2a and 2b is parallel to the y-axis). However, as illustrated in FIG. 22, the optical axis (c-axis) of the claddings 2a and 2b may be parallel to the bonded surfaces between the laser medium 1 and the claddings 2a and 2b (c-axis of the claddings 2a and 2b is parallel to the z-axis).

In the twelfth embodiment, the optical axis (c-axis) of the claddings 2a and 2b is parallel to the z-axis. An angle formed by the traveling direction of the laser beam and the c-axis is defined as the angle θ (defined from symmetry as 0°≤θ≤180°).

Here, among refractive indexes nTE and nTM (=ny) of the claddings 2a and 2b for two polarized lights perpendicular to a light axis of the laser beam propagating in the laser medium 1, the refractive index nTE varies depending on the angle θ formed in a range of ne<nTE<no or no<nTE<ne.

For example, when Er—Yb-codoped phosphate glass is used as the laser medium 1 and calcite as the claddings 2a and 2b while a wavelength of the laser beam is 1535 nm, the relationship of nTE<nc is satisfied in a range of 59°≤θ≤121°.

When θ=approx. 59° or θ=approx. 121°, a relationship of nTE≈nc holds and thus a difference between a refractive index nc of the laser medium 1 and the refractive index nTE of the claddings 2a and 2b for TE mode can be reduced. Therefore, it is possible to mitigate occurrence of high-order modes.

In this manner, even when the c-axis of the claddings 2a and 2b is parallel to the z-axis, if ne<no, it is possible to adjust the refractive index of the claddings 2a and 2b for TE mode and to control a spatial mode.

It is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

A flat waveguide-type laser device according to the present invention is suitable for usage as a laser beam source for providing light with a linear polarization.

EXPLANATIONS OF REFERENCE NUMERALS 1 laser medium (isotropic medium of a flat plate shape);
2a, 2b cladding (first cladding); 3 substrate;
4 bonding agent;
5a, 5b absorbing layer;
6 high-reflectance coating;
7a, 7b cladding (second cladding);
8a, 8b high-reflectance coating; and
9 end surface of laser medium 1.

The invention claimed is:
1. A flat waveguide-type laser device, comprising:
an isotropic medium of a flat plate shape for transmitting a laser beam incident from a side surface thereof; and
a cladding bonded to at least one of an upper surface and a lower surface of the isotropic medium,
the cladding including a birefringent crystal having two different refractive indexes in two polarization directions perpendicular to a light axis that is parallel to a traveling direction of the laser beam in the isotropic medium, and
the isotropic medium including a material having a refractive index between the two different refractive indexes in the two polarization directions in the cladding.
2. The flat waveguide-type laser device according to claim 1, wherein the isotropic medium includes a laser medium for absorbing incident excitation light to form a population inversion state to thereby generate a gain, the laser medium amplifying the laser beam incident from the side surface with the gain when the population inversion state is formed.
3. The flat waveguide-type laser device according to claim 2, wherein the laser medium is glass doped with an active ion, and the birefringent crystal is calcite, BBO, LBO, or quartz.
4. The flat waveguide-type laser device according to claim 3, wherein the laser medium includes, as the glass doped with an active ion, Er—Yb-codoped phosphate glass.
5. The flat waveguide-type laser device according to claim 2, wherein one surface of an upper surface and a lower surface of the cladding is a roughened surface that is not bonded to the isotropic medium.
6. The flat waveguide-type laser device according to claim 2, wherein one surface of an upper surface and a lower surface of the cladding is not bonded to the isotropic medium, and an absorbing layer absorbing the laser beam is bonded to the one surface.
7. The flat waveguide-type laser device according to claim 6, wherein the absorbing layer includes chromium or a chromium-doped material.
8. The flat waveguide-type laser device according to claim 1, wherein an optical axis of the birefringent crystal is tilted relative to the light axis.
9. The flat waveguide-type laser device according to claim 1, wherein the birefringent crystal is a biaxial crystal, and at least one of two birefringence axes of the biaxial crystal is tilted relative to the light axis.
10. A flat waveguide-type laser device, comprising:
an isotropic medium of a flat plate shape for transmitting a laser beam incident from a side surface thereof;
a first cladding bonded to at least one of an upper surface and a lower surface of the isotropic medium; and
a second cladding bonded to a surface which is not bonded to the isotropic medium and is one of an upper surface and a lower surface of the first cladding,
the isotropic medium including a laser medium for absorbing incident excitation light to form a population inversion state to thereby generate a gain and for amplifying the laser beam incident from the side surface with the gain when the population inversion state is formed,
the first cladding including a birefringent crystal having two different refractive indexes in two polarization directions perpendicular to a light axis that is parallel to a traveling direction of the laser beam in the isotropic medium,
the second cladding including a material that allows a refractive index of the second cladding for the excitation light to be lower than a refractive index of the first cladding for the excitation light when a refractive index of the isotropic medium for the excitation light is higher than the refractive index of the first cladding for the excitation light, and
the second cladding including a material that allows a refractive index of the second cladding for the excitation light to be lower than the refractive index of the isotropic medium for the excitation light when the refractive index of the isotropic medium for the excitation light is lower than the refractive index of the first cladding for the excitation light.

* * * * *